Figure 1:
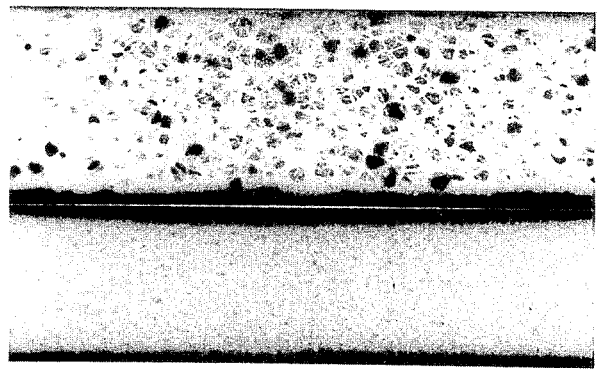

United States Patent [19]

Kühnel et al.

[11] Patent Number: 4,680,317

[45] Date of Patent: Jul. 14, 1987

[54] MOLDING COMPOSITION FOR CROSSLINKED FOAM MATERIAL FROM POLYOLEFINS AND ETHYLENE-PROPYLENE ELASTOMER, AND PROCESS FOR THE PRODUCTION OF THE FOAM MATERIAL

[75] Inventors: Werner Kühnel, Neunkirchen-Schoneshof; Paul Spielau, Troisdorf-Eschmar, both of Fed. Rep. of Germany

[73] Assignee: Dynamit Nobel Aktiengesellschaft, Troisdorf, Fed. Rep. of Germany

[21] Appl. No.: 727,739

[22] Filed: Apr. 29, 1985

Related U.S. Application Data

[63] Continuation of Ser. No. 408,769, Aug. 17, 1982, abandoned.

[30] Foreign Application Priority Data

Aug. 17, 1981 [DE] Fed. Rep. of Germany ....... 3132439

[51] Int. Cl.$^4$ .............................................. C08J 9/10
[52] U.S. Cl. ...................................... 521/89; 521/96; 521/134; 521/140; 525/211; 525/240
[58] Field of Search .................. 521/134, 140, 96, 89; 525/211, 240

[56] References Cited

U.S. PATENT DOCUMENTS

| | | | |
|---|---|---|---|
| 3,717,559 | 2/1973 | Oyama et al. | 521/140 |
| 3,891,724 | 6/1975 | Yaeda et al. | 521/140 |
| 3,950,278 | 4/1976 | Wada et al. | 521/140 |
| 4,203,815 | 5/1980 | Noda et al. | 521/140 |
| 4,212,787 | 7/1980 | Matsuda et al. | 525/240 |
| 4,247,652 | 1/1981 | Matsuda et al. | 525/240 |
| 4,252,909 | 2/1981 | Honma et al. | 521/140 |
| 4,307,204 | 12/1981 | Vidal | 521/134 |
| 4,319,004 | 3/1982 | Spielau et al. | 525/211 |
| 4,370,378 | 1/1983 | Zabrocki et al. | 521/140 |
| 4,384,032 | 5/1983 | Tashiro et al. | 521/140 |

FOREIGN PATENT DOCUMENTS

| | | |
|---|---|---|
| 1291115 | 3/1969 | Fed. Rep. of Germany . |
| 2238366 | 3/1974 | Fed. Rep. of Germany . |
| 2908081 | 9/1979 | Fed. Rep. of Germany . |
| 1694130 | 4/1980 | Fed. Rep. of Germany . |
| 2911719 | 9/1980 | Fed. Rep. of Germany . |

*Primary Examiner*—Morton Foelak
*Attorney, Agent, or Firm*—Antonelli, Terry & Wands

[57] ABSTRACT

An expandable molding composition for the production of a cross-linked foam material, and a process for the manufacture of the foam from a mixture of polyolefin and a selected, partially crystalline ethylene-propylene terpolymer, a blowing agent, and optionally a crosslinking agent are disclosed.

18 Claims, 2 Drawing Figures

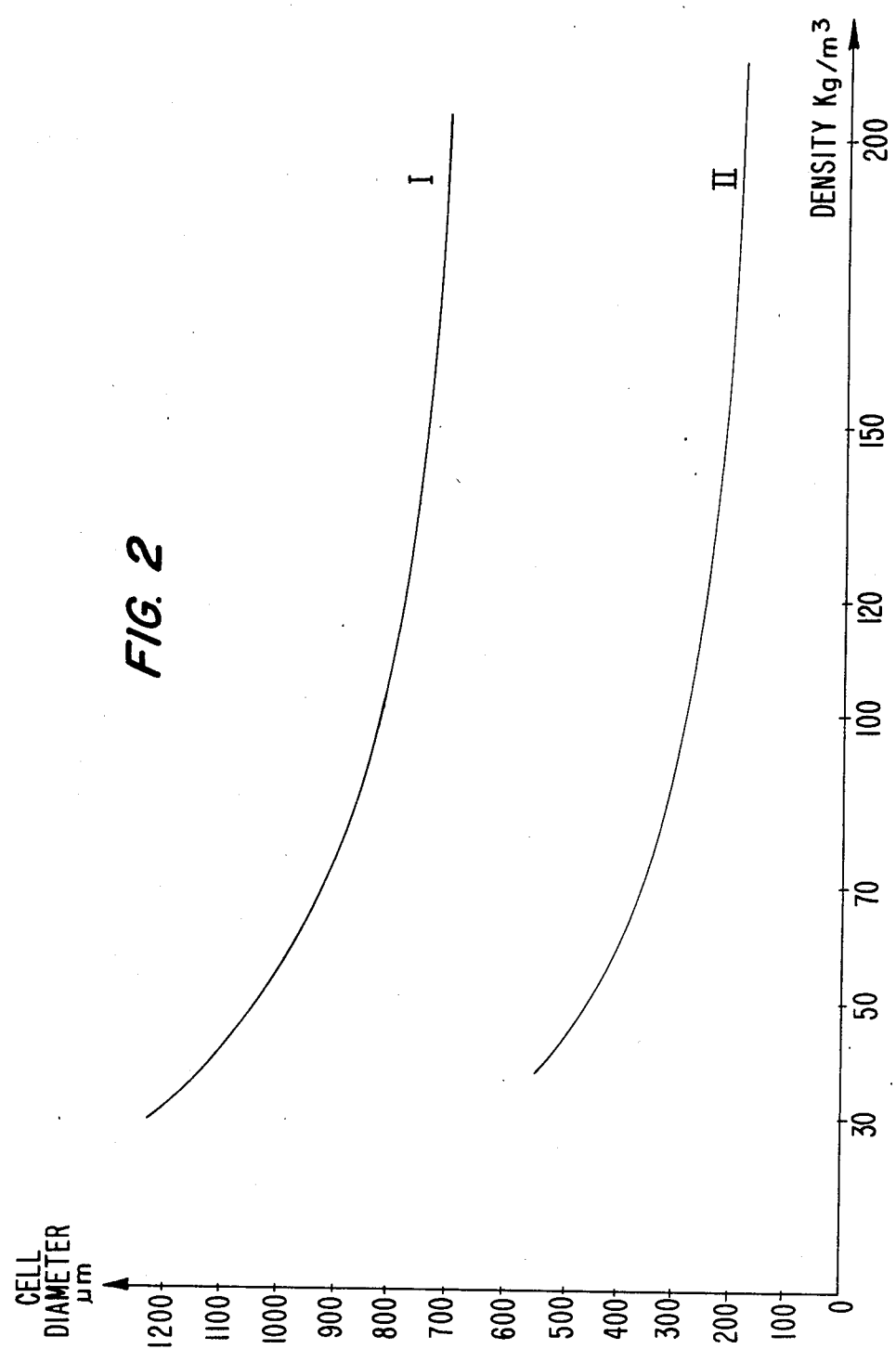

MOLDING COMPOSITION FOR CROSSLINKED FOAM MATERIAL FROM POLYOLEFINS AND ETHYLENE-PROPYLENE ELASTOMER, AND PROCESS FOR THE PRODUCTION OF THE FOAM MATERIAL

This is a continuation of application Ser. No. 408,769, filed Aug. 17, 1982 now abandoned.

This invention relates to an expandable molding composition for the production of a corsslinked foam basically comprised of a mixture of a polyolefin and an ethylene-propylene elastomer, a blowing agent, and optionally a crosslinking agent; to a process for the manufacture of crosslinked foam materials having a very fine, uniform, predominantly closed cell structure, from a mixture of polyolefin and an ethylenepropylene elastomer; as well as to the corresponding, crosslinked foam products.

It is known to crosslink polyolefins with peroxides and/or highenergy radiation, and to simultaneously or subsequently expand same with chemical blowing agents, such as, for example, azodicarbonamide, sulfonylhydrazine, sulfonyl semicarbazides, and the like; see, for example, DAS (German Published Application) No. 1,694,130. In this process, up to 100 parts by weight of at least one elastomer and/or synthetic resin miscible with the polyolefin can be incorporated per 100 parts by weight of polyolefin; in this connection, elastomers miscible with polyolefin are understood to mean, for example, natural rubber, ethylene-propylene rubber, butyl rubber, polyisobutylene, styrene-butadiene rubber, polybutadiene, polybutene and polyisoprene.

Radiation-crosslinked polyolefin foam materials have been disclosed, for example, in DOS (German Unexamined Laid-Open Application) No. 1,569,465; these polyolefin foam materials can be modified by the addition of 5-500 parts by weight of an elastomer, such as natural rubber, ethylene-propylene rubber, styrene-butadiene rubber, nitrile-butadiene rubber, poly-cis-butadiene rubber, neoprene rubber, based on 100 parts by weight of the polyolefin, especially polyethylene.

The modification of crosslinked polyolefin foam materials by adding rubber or other synthetic resins serves for the purpose of transferring to the foam material the physical properties, in particular, of the added rubbers or synthetic resins, such as temperature stability, improved mechanical resistance, higher elasticity and tensile strength. In this connection, the addition of elastomers imparts to the polyolefin foam materials a higher elasticity. It is also known to produce crosslinked polyolefin foam materials having a higher temperature stability on the basis of polypropylene, see DAS No. 2,839,733 and DOS No. 3,032,635. It is furthermore conventional to modify crosslinked polyolefin foam materials by the addition of polybutadiene for the manufacture of very lightweight foam materials, see DAS No. 1,930,134 and DOS No. 2,911,719.

Another objective is to produce very fine-cellular polyolefin foam materials. In this context, DAS No. 2,351,515 proposes, in a process for the production of fine-cellular foam materials from polyolefins by peroxidic crosslinking and expansion with the aid of a blowing agent, to add to the polyolefin besides the peroxide and the blowing agent, another blowing agent as an auxiliary material, which another blowing agent has a lower temperature decomposition range than the first-mentioned blowing agent, to attain in this way a size reduction of the cells and thus a more fine-cellular foam material.

DOS No. 2,348,468 suggests a method for the production of crosslinked polyolefin foam material having a very fine and uniform, closed cell structure wherein the fine-cellular property is to be obtained with the aid of a blowing or expanding agent with an average particle diameter of 10-30 $\mu$m, a suitable blowing agent being, for example, azodicarbonamide.

Cell size, uniformity of the closed cells, and cell wall structure affect the properties of a foam material to a quite substantial degree; the finer and more uniform the cell size, the better the heat-insulating and damping properties, as well as the appearance—a smooth, fine surface—of the foam material.

While the methods according to the prior art utilize in all instances additional agents for producing the finer cell structure of a crosslinked polyolefin foam material, it has been found surprisingly according to this invention that a mixture of polyolefin with a selected elastomer likewise results in a very fine-cellular, elastic foam material having a uniform cell structure. The invention attains the posed objective by an expandable molding composition containing, per 100 parts by weight of the polyolefin, 25–150 parts by weight of a partially crystalline ethylene-propylene terpolymer having a tensile strength higher than 5.0N/mm$^2$, a Mooney viscosity (ML 1+4/100) of larger than 50 with a melting heat $\Delta H_s$ larger than 10 J/g, and a content of 60–80% by weight of ethylene, 10–38% by weight of propylene, and 2–10% by weight of a tercomponent, especially ethylidene norbornene or 1,4-hexadiene.

The basic aspect of the invention is seen in that it is possible to manufacture, by the addition of a selected, partially crystalline ethylene-propylene terpolymer with specific properties, crosslinked foam materials based on polyolefins, which materials not only exhibit improved physical characteristics due to the ethylene-propylene-terpolymer elastomer added thereto, but simultaneously result surprisingly in cell size reduction, i.e., a fine-cellular structure. As will be demonstrated in the examples, only the special, partially crystalline ethylene-propylene terpolymer selected according to this invention are suitable for solving the problem underlying the present invention, i.e., to produce a smooth surface, finer cells as compared with the conventional polyolefin foam materials. The selected ethylene-propylene terpolymers affect processability as well as quality of the thus-produced foam material in a beneficial way. The essential property for selecting the ethylene-propylene terpolymers is their partial crystallinity, identified by the melting curves measured according to the DSC method in a differential scanning calorimeter. The maximum of the melting peak, measured as the temperature TS in °C. according to the DSC curve, is called endothermic peak, which can be very narrow, but can also encompass a range. In case of ethylene-propylene terpolymers, the temperature TS is in the range of about 50° C. The amount of heat required for melting, the so-called melting heat $\Delta H_s$, likewise measured by the DSC method, yields information on the presence of crystalline blocks in the ethylene-propylene terpolymer. Such partially crystalline ethylene-propylene terpolymers with a melting heat of at least 10 J/g are utilized in accordance with this invention.

The crosslinked foam articles manufactured with the expandable molding composition of this invention, which articles are either chemically crosslinked with a crosslinking agent or are crosslinked with the aid of high-energy radiation, exhibit on the average two to five times the number of cells as compared with polyolefin foam materials on the same basis without the ethylene-propylene terpolymers added according to this invention. The pore size and/or cell size of the foam material must be considered relative in all cases; this size is also dependent in all instances on the density (density per unit volume) of the foam material and on the thickness of the thus-manufactured foam sheet or components. The higher the density of a foam material, the smaller the cells, and the thicker a foam sheet, the larger the cells, under otherwise identical conditions.

Any conventional type of crosslinking can be employed with the foam material crosslinked according to this invention. One possibility is the use of high-energy radiation, in which case an expandable molding composition is exposed to ionizing radiation. Another method provides the use of a crosslinking agent. Examples for suitable crosslinking agents for the invention are peroxides, expecially dicumyl peroxide, but also 2,5-dimethyl-2,5-(tert-butyl)peroxyhexane, 1,10-decane-bis-sulfonacid, para-quinonedioxime, and other compounds. These crosslinking agents are preferably used in the expandable molding composition in amounts of 0.6–1.6 parts by weight, based on 100 parts by weight of polyolefin and 25–150 parts by weight of partially crystalline ethylene-propylene terpolymer selected according to this invention.

The blowing agent preferably utilized in the process and in the molding composition of this invention is one, the decomposition temperature of which is equal to or higher than that of the crosslinking agent. Azodicarbonamide and its derivatives are especially preferred, but also suitable are blowing agents such as dinitrosopentamethylenetetramine, p,p'-oxybis(benzenesulfonylhydrazide), and toluenesulfonyl-hydrazide. The amount of blowing agent to be employed is dependent on the desired density of the foam material to be produced and generally ranges between 0.5 and 25% by weight, based on the total, expandable molding composition, making it possible to manufacture foam materials having densities of 25–300 kg/m$^3$ and more.

A preferred polyolefin for purposes of the invention is polyethylene with a melt index (MFI 190/2) of 1–8 and a density of 0.91–0.96 g/cm$^3$, preferably low density polyethylene (high pressure polyethylene). However, the term "polyolefin" as used herein is to encompass also mixtures of polyethylene with polypropylene and copolymers of ethylene, preferably those produced from monomer mixtures with a predominant proportion of ethylene, as well as mixtures thereof with homopolymers of ethylene.

It is furthermore possible to add to the expandable and to be crosslinked molding composition, before the processing thereof, additives ordinarily employed with synthetic resins based on polyolefins, such as light protection agents, pigments, fillers, flame retardants, antistats, mold release agents, etc.

However, in this connection care must be taken that the additives are compatible with the molding composition of this invention with respect to the fine-cellular structure attainable; for example, the addition of antioxidants reduces the fine-cellular property.

The molding composition of this invention will be described in greater detail below. Preferably, partially crystalline ethylene-propylene terpolymers of high strength are employed, also known as high green strength elastomers, exhibiting a tensile strength of above 8N/mm$^2$ to 20N/mm$^2$ and more. The selected ethylene-propylene terpolymers moreover are to exhibit a very good processability; for this reason, ethylene-propylene terpolymers are selected having a Mooney viscosity ML 1+4/100 of larger than 50. Especially suitable are ethylene-propylene terpolymers prepared with a monomeric mixture of 65–80% by weight of ethylene, 10–31% by weight of propylene and 4–10% by weight of a tercomponent, particularly a non-conjugated diene. Especially well suitable proved to be ethylene-propylene terpolymers prepared with a tercomponent of ethylidene norbornene or 1,4-hexadiene. Suitable other tercomponents are dicyclopentadiene, an alkenyl norbornene or a cycloalkadiene. The fine cellular property of the crosslinked foam material desired according to this invention is attained by adding minimum amounts of the selected, partially crystalline ethylene-propylene terpolymer; required are at least 25 parts by weight, based on 100 parts by weight of polyolefin. Preferably, 25–60 parts by weight of ethylene-propylene terpolymers are used per 100 parts by weight of polyolefin. This is of significance insofar as, for example, polyethylene is a less expensive synthetic resin as compared with an ethylene-propylene terpolymer, and the crosslinked polyolefin foam materials producible according to this invention with a lower proportion of ethylene-propylene terpolymer are more economical.

A preferred process for the manufacture of crosslinked foam materials according to the invention with a very fine, uniform, predominantly closed cell structure on the basis of a mixture of polyolefin and ethylene-propylene elastomer, a blowing agent, and optionally a crosslinked agent is conducted by first making a homogeneous mixture from the polyolefin and 25–150% by weight, based on the weight of the polyolefin, of a partially crystalline ethylene-propylene terpolymer having a tensile strength larger than 5.0 N/mm$^2$, a Mooney viscosity (ML 1+4/100) larger than 50, and a melting heat $\Delta H_s$ larger than 10 J/g and containing 60–80% by weight of ethylene,
10–38% by weight of propylene, and
2–10% by weight of a tercomponent of ethylidene norbornene or 1,4-hexadiene, as well as a suitable blowing agent and optionally a suitable crosslinking agent, at below the decomposition temperatures of the crosslinking agent and blowing agent, the blowing agent having a decomposition temperature lying above the decomposition temperature of the crosslinking agent; and by subsequently molding the mixture, treating same optionally with high energy radiation with a dose of 1–20 Mrad and/or heating same for cross-linking and expansion purposes with hot air, radiation and/or a liquid bath to temperatures of between 200° and 240° C.

A special advantage of the process of this invention resides in that it is possible to continuously manufacture, without the use of external pressure or molds, foam sheets on the basis of polyolefin and ethylene-propylene elastomer having very fine cells in homogeneous quality and with a smooth surface.

A further improvement in the process of this invention for the production of very fine cellular homogeneous foam materials on the basis of polyolefin and ethylene-propylene terpolymers is surprisingly achieved by subjecting the molded mixture prior to crosslinking and expansion to a temperature treatment. This temperature treatment can be either a short term one, in which case it is conducted preferably at a temperature lying below the decomposition temperature of the crosslinking agent, especially at a temperature of between about 90° and 110° C. during a period of 2–90 minutes; or it is conducted at room temperature, i.e., about 15°–20° C., for a period of at least one day. The latter mode of operation means, for example, that the molded mixture can be stored before being thereafter subjected to crosslinking and expansion. The explanation for the further improvement of the producible foam with respect to its fine cellular structure and homogeneity could be seen in that a very minor crosslinking can take place on account of the radicals liberated during the molding of the homogeneous mixture.

This improvement in the producible foam in accordance with the process steps provided by the invention occurs with an increase in the ethylene-propylene terpolymer proportion.

It is possible with the aid of the process of this invention to manufacture crosslinked polyolefin foam materials having a very high degree of fine cellular structure and homogeneity, small wall thicknesses, a closed surface, as well as a high elasticity and softness in handle. Furthermore, the properties of the foam material which can be manufactured with the molding composition of the invention and the process are substantially improved as compared with polyolefin foam materials without the addition of the ethylene-propylene terpolymers selected by this invention, especially with regard to compressive stress, dynamic perforation, as well as heat insulation and elongation at rupture. The foam materials produced according to this invention can be used advantageously for the manufacture of molded components by vacuum forming since they exhibit a good thermal deformability, as well as for high quality heat insulations at elevated temperatures.

The crosslinked foam materials producible according to this invention exhibit unexpectedly high ductility and excellent processability for vacuum forming by the deep drawing method and similar molding processes, with good temperature stability and a very great fine cellular structure.

The expandable molding composition of this invention requires relatively small amounts of crosslinking agent, for example peroxides, to obtain sufficient crosslinking during the manufacture of the crosslinked foam material.

This effect is attained by the addition of ethylene-propylene terpolymer according to this invention, since this material is more easily crosslinked than polyolefins and thus requires only small amounts of crosslinking agent as an additive to the total mixture, as compared to mere polyolefin foams.

A crosslinked foam material normally is not crosslinked to an extent of 100%, but between 40 and 80%. The degree of crosslinking is measured, for example, by a twelve-hour extraction of the crosslinked foam material at 85° C. with tetrahydronaphthalene as the solution extractant, as the gel content. The gel content then should range between 40 and 80% by weight in the foam materials produced according to the invention.

The expandable molding composition of this invention due to the provided selection of materials can be processed especially readily, i.e., extruded, in order to produce the homogeneous mixture and shape of the expandable molding composition as a flat sheet or a profile for the subsequent crosslinking and expansion steps.

The invention will be described in greater detail in the following examples.

The following measuring methods were utilized for examination of the properties of the ethylene-propylene-terpolymers:

MFI (190/2) according to DIN 53 735.

Mooney viscosity (ML 1+4/100) according to DIN 53 523.

Melting heat $\Delta H_s$ in the differential scanning calorimeter DSC in J/g.

Tensile strength (at break) N/mm$^2$ according to DIN 53 455.

Elongation at rupture in % according to DIN 53 455.

PREPARATION OF THE SPECIMENS

The weighed ingredients of the formulation were homogenized into a rolled sheet in a rolling mill at a rolling temperature of 110° C. and thereafter rolled for another 5 minutes.

The resultant sheet is smoothed in a press at 130° C., under 50 bar and with a residence time of 8 minutes. From this panel, specimens are punched out having a diameter of 8 cm and these specimens are then expanded into foamed components in a drying cabinet at a temperature of 210° C. The unexpanded panels had a thickness of 4 mm.

The specimens can also be produced by mixing the formulation in continuous compounding units; the thus obtained granulated material is thereafter extruded through a fishtail-die extruder into a sheet blank, which latter is then expanded in a channel which is heatable, for example, into an endless foamed sheet under crosslinking.

The tensile strength (at maximum load) of the specimen is determined according to DIN 53571.

EXAMPLES 1–10

In accordance with Examples 1–10, which are summarized in Table 1 hereinafter (with the parts by weight of each ingredient listed therein) formulations were prepared from low density polyethylene with a melt index MFI (190/2) of 3 g/10 minutes and a density of 0.92 g/cm$^3$ and from an ethylene-propylene terpolymer (EPDM) containing 70% by weight of ethylene, 25% by weight of propylene, and 5% by weight of 1,4-hexadiene, with a tensile strength (at break) of 22N/mm$^2$, a Mooney viscosity ML 1+4/100 of 87, and a melting heat $\Delta H_s$ of 25, dicumyl peroxide 40% strength as crosslinking agent, and azodicarbonamide as the blowing agent; from this composition, specimens were produced in a press as described above, and expanded into foamed components. Table 1 lists the resultant bulk densities of the foamed components, their surface quality and fine cellular structure.

EXAMPLES 11 AND 12

Specimens were produced in a continuous procedure from the same formulation ingredients as in Examples 1–10; the results are likewise compiled in Table 1.

The appended FIG. 1 illustrates two photographs of cross sections through the thus manufactured specimens, showing the cell size. The enlargement is 2.5:1. Photograph A is the specimen according to Example 1, a normal polyethylene foam material with a density of 30 kg/m$^3$ without EPDM, and photograph B is the foam material made from a molding composition with the addition of 30 parts by weight of EPDM, a weight per unit volume (density) of 38 kg/m$^3$ according to Example 3, manufactured by this invention. This foam material is of very fine cellular structure and has a smooth surface.

TABLE 1

| Example No. | 1 | 2 | 3 | 4 | 5 | 6 | 7 | 8 | 9 | 10 | 11 | 12 |
|---|---|---|---|---|---|---|---|---|---|---|---|---|
| Parts by Weight | | | | | | | | | | | | |
| LDP - Polyethylene | 82 | 82 | 82 | 82 | 82 | 82 | 100 | 100 | 100 | 100 | 100 | 100 |
| 40% Dicumyl Peroxide | 2 | 2 | 2 | 2 | 2 | 2 | 2.8 | 2.8 | 2.8 | 2.8 | 2.4 | 2.8 |
| Azodicarbonamide | 16 | 16 | 16 | 16 | 16 | 16 | 4.2 | 4.2 | 4.2 | 4.2 | 6 | 4.2 |
| EPDM | — | 20 | 30 | 40 | 60 | 100 | 20 | 30 | 60 | 100 | 30 | — |
| Density kg/m$^3$ | 30 | 34 | 38 | 42 | 48 | 60 | 165 | 180 | 253 | 365 | 130 | 130 |
| Fine-Cell Structure | No | Some | Yes | Yes | Yes | Yes | No | Yes | Yes | Yes | Yes | No |
| Surface | R | S | S | S | S | S | S | S | S | S | S | R |
| Average Pore Size (μm) | 1200 | 700 | 500 | 450 | 400 | 400 | 800 | 400 | 200 | 200 | 500 | 900 |

R = rough
S = smooth

EXAMPLES 13–22

The Table 2, which follows, summarizes Examples 13–22 wherein merely the amounts of blowing agent have been varied, starting with an identical mixture of low-density polyethylene and EPDM with cross-linking agent, thus producing foamed articles of various densities. It is demonstrated in all instances that the desired fine cellular structure can be achieved, with a smooth surface. The raw materials utilized correspond in their properties and make up to the raw materials described in Examples 1–10.

TABLE 2

| Example No. | 13 | 14 | 15 | 16 | 17 | 18 | 19 | 20 | 21 | 22 |
|---|---|---|---|---|---|---|---|---|---|---|
| Parts by Weight | | | | | | | | | | |
| LDP - Polyethylene | 100 | 100 | 100 | 100 | 100 | 100 | 100 | 100 | 100 | 100 |
| 40% Dicumyl Peroxide | 2.4 | 2.4 | 2.4 | 2.4 | 2.4 | 2.4 | 2.4 | 2.4 | 2.4 | 2.4 |
| Azodicarbonamide | 18.3 | 15 | 12.9 | 11.5 | 8.0 | 6.5 | 4.8 | 4.2 | 3.4 | 2.4 |
| EPDM | 40 | 40 | 40 | 40 | 40 | 40 | 40 | 40 | 40 | 40 |
| Density kg/m$^3$ | 40 | 46 | 51 | 61 | 88 | 115 | 158 | 163 | 210 | 322 |
| Fine-Cell Structure | Yes | Yes | Yes | Yes | Yes | Yes | Yes | Yes | Yes | Yes |
| Surface | S | S | S | S | S | S | S | S | S | S |
| Average Pore Size (μm) | 500 | 450 | 450 | 400 | 300 | 250 | 200 | 200 | 180 | 0 |

S = smooth

Table 3 compiles the properties of a crosslinked polyethylene foam material without additional of EPDM having a density of 130 kg/m$^3$, as per Comparative Example 12, as compared with a foamed article according to this invention as per Example 11, containing 30 parts by weight of EPDM per 100 parts by weight of polyethylene, with the same density. It can be seen that, with comparable foam materials, namely with the same density, the foam materials of this invention exhibit essentially improved properties with respect to strength and ductility and elasticity. The foam materials of this invention are, therefore, excellently suitable for the manufacture of molded components, for example by vacuum forming, deep drawing, etc. Moreover, they have improved insulating characteristics.

TABLE 3

| Properties | Example 12 | Example 11 |
|---|---|---|
| Foam panel thickness mm | ~3.6 | ~3.6 |
| density kg/m$^3$ | 130 | 130 |
| Tensile strength N/mm$^2$ (at maximum load) | | |
| longitudinal | 1.3 | 1.5 |
| transverse | 1.0 | 1.2 |
| (DIN 53 571) | | |
| Elongation at rupture % | | |
| longitudinal | 110 | 226 |
| transverse | 118 | 172 |
| (DIN 53 571) | | |

TABLE 3-continued

| Properties | Example 12 | Example 11 |
|---|---|---|
| Compressive stress at 25% compression (DIN 53 577) N/mm$^2$ | 0.3 | 22 |
| Dynamic perforation test weight 1 kg, diameter 10 mm, falling height in mm at penetration 23° C. | 125 | 225 |
| Thermal conductivity W/K · m at 23° C. | 0.039 | 0.033 |

EXAMPLES 23–26

Foam components were produced from 100 parts by weight of low density polyethylene with a melt index MFI (190/2) of 3 g/10 minutes and a density of 0.92 g/cm$^3$, 2.3 parts by weight of 40% strength dicumyl peroxide, 19 parts by weight of azodicarbonamide, as well as quantities of 20, 40, 60 and 80 parts by weight, respectively, of an ethylene-propylene terpolymer containing 67% by weight of ethylene, 27% by weight of propylene, and 6% by weight of ethylidene norbornene with a Mooney viscosity ML 1+4/100 of 85, and a melting heat $\Delta H_s$ of 14 J/g and a tensile strength (at break) of 11.2N/mm$^2$. Only the specimens with 40 and more parts by weight of EPDM exhibited a very good fine cellular structure and a smooth surface. The densities of the foamed components were 31, 35, 41, 45 kg/m$^3$.

EXAMPLES 27–30

Mixtures were produced from 100 parts by weight of low density polyethylene, MFI 190/2 of 3 g/10 minutes, 19 parts by weight of azodicarbonamide, 2.3 parts by weight of 40% strength dicumyl peroxide, with the addition of 20, 40, 60 and 80 parts by weight, respectively, of an ethylene-propylene elastomer with 70–76% ethylene and 24–30% propylene, a Mooney viscosity ML 1+4/100 of 85, and a melting heat $\Delta H_s$ of 21 J/g, and a tensile strength at break of 5.8N/mm$^2$; from this mixture, foamed articles were produced which, however, exhibit a rough surface and were not fine cellular, but rather corresponded in quality to that of FIG. 1, Photograph A. The ethylene-propylene elastomers used did not correspond to the qualifications provided according to this invention.

EXAMPLES 31 AND 32

Specimens were produced with 100 parts by weight of low density polyethylene, MFI 190/2 of 3 g/10 minutes and 19 parts by weight of azodicarbonamide and 2.3 parts by weight of 40% strength dicumyl peroxide, together with 40 parts by weight and 80 parts by weight, respectively, of an ethylene-propylene elastomer containing 54% by weight of ethylene, 42% by weight of propylene, and 4% by weight of ethylidene norbornene, with a Mooney viscosity ML 1+4/100 of about 94, a melting heat $\Delta H_s$ of 0 (amorphous condition), a tensile strength (at break) of 0.162N/mm$^2$; these specimens, however, did not become fine cellular, either, but rather were coarse cellular with a rough surface. The densities obtained were 38, 45 and 50 kg/m$^3$, respectively.

As indicated above, the cell size attainable and thus the cellular structure of the foam material is dependent on the formulation, i.e., the ingredients of the recipe, as well as on the size of the foamed article to be produced. The cell size obtainable is in all cases dependent on the density of the foam material to be manufactured and on the thickness of the molded, not yet expanded mixture. In this connection, the fact applies that, with increasing density, the cells become ever smaller, with otherwise constant parameters. In contrast thereto, with an increasing thickness of the not as yet expanded, molded mixture, the cells become increasingly larger with otherwise identical parameters.

FIG. 2 shows the dependency of the average cell diameter attainable on the density of a polyolefin foam without (curve I) and with the addition of 40% by weight of ethylene-propylene terpolymer according to this invention (curve II), as described in Examples 1-10, with a thickness of the molded, not as yet expanded panel of 4 mm.

We claim:

1. An expandable molding composition for the production of a crosslinked foam material that has a predominantly closed cell structure with an average pore size of not more than 500 μm and that is a mixture consisting essentially of polyethylene and a partially crystalline ethylene-propylene terpolymer, and a blowing agent, in the presence of a crosslinking agent, the amount of the terpolymer in said composition, per 100 parts by weight of polyethylene, being 25-150 parts by weight, and said terpolymer having a tensile strength at break of at least 8.0N/mm$^2$, a Mooney viscosity (ML 1+4/100) larger than 50, with a melting heat (according to DSC) $\Delta H_s$ of at least 10 J/g, and a content of 60-80% by weight of ethylene, 10-38% by weight of propylene and 2-10% of a non-conjugated diene tercomponent of ethylidene norbornene or 1,4-hexadiene.

2. A molding composition according to claim 1, wherein the ethylene-propylene terpolymer has a content of 65-80% by weight of ethylene, 10-31% by weight of propylene, and 4-10% by weight of the tercomponent.

3. A molding composition according to claim 1, wherein the amount of the ethylene-propylene terpolymer in said composition, per 100 parts by weight of polyethylene, is 25-60 parts by weight.

4. A molding composition according to claim 1, wherein the polyethylene has a melt index (MFI 190/2) of 1-8 and a density of 0.91-0.96 g/cm$^3$.

5. An expandable molding composition for the production of a chemically crosslinked foam material that has a predominantly closed cell structure with an average pore size of not more than 500 μm and that is a mixture consisting essentially of polyethylene and a partially crystalline ethylene-propylene terpolymer, a blowing agent and a crosslinking agent; the amount of said terpolymer, per 100 parts by weight of polyethylene being 25-150 parts by weight, the terpolymer having a tensile strength at break of at least 8.0N/mm$^2$, a Mooney viscosity (ML 1+4/100) larger than 50, a melting heat (DSC) $\Delta H_s$ larger than 10 J/g, and a content of 60-80% by weight of ethylene, 10-38% by weight of propylene, and 2-10% by weight of a tercomponent of ethylidene norbornene or 1,4-hexadiene, and the amount of the crosslinking agent being 0.6-1.6 parts by weight per 100 parts by weight of polyethylene.

6. A molding composition according to claim 5, wherein the peroxide crosslinking agent comprises dicumyl peroxide.

7. A molding composition according to claim 6, wherein the blowing agent has a decomposition temperature higher than that of the crosslinking agent and includes azodicarbonamide, dinitrosopentamethylenetetramine, p,p'-oxybis(benzenesulfonylhydrazide), or toluenesulfonylhydrazide.

8. A crosslinked foam material component formed on a mixture consisting essentially of polyethylene and a partially crystalline ethylene-propylene terpolymer, a blowing agent, and optionally a crosslinking agent, the amount of said terpolymer, per 100 parts by weight of polyethylene, being 25-150 parts by weight and the partially crystalline ethylene-propylene terpolymer having a tensile strength at break of at least 8.0N/mm$^2$, a Mooney viscosity (ML 1+4/100) larger than 50, a melting heat $\Delta H_s$ (DSC) larger than 10 J/g, and being prepared from a monomeric mixture of 60-80% by weight of ethylene, 10-38% by weight of propylene, and 2-10% by weight of a tercomponent of ethylidene norbornene or 1,4-hexadiene, and said foam material being of a closed-cell very fine cellular structure with an average pore size of not more than 500 μm.

9. A process for the production of crosslinked foam materials with a very fine, uniform predominantly closed cell structure with an average pore size of not more than 500 μm and based on a mixture of polyethylene and a partially crystalline ethylene-propylene terpolymer, a blowing agent, and optionally a crosslinking agent, comprising first preparing a homogeneous mixture consisting essentially of the polyethylene and 25-150% by weight, based on the weight of the polyethylene, of a partially crystalline ethylene-propylene terpolymer having a tensile strength of at least 8.0N/mm$^2$, a Mooney viscosity (ML 1+4/100) larger than 50, and a melting heat $\Delta H_s$ (according to DSC) larger than 10 J/g, and containing 60-80% by weight of ethylene, 10-38% by weight of propylene, and 2-10% by weight of a tercomponent of ethylidene norbornene or 1,4-hexadiene, as well as a suitable blowing agent and optionally a suitable crosslinking agent, at below the decomposition temperatures of the crosslinking agent and blowing agent, the blowing agent having a decomposition temperature lying above the decomposition temperature of the crosslinking agent; and subsequently molding the mixture, treating same optionally with high energy radiation with a dose of 1–20 Mrad and/or heating same for crosslinking and expansion to provide said cell structure with hot air, radiation and/or a liquid bath to temperatures of between 200° and 240° C.

10. A process according to claim 9, wherein said ethylene-propylene terpolymer contains 65–80% by weight of ethylene, 10–31% by weight of propylene, and 4–10% by weight of the tercomponent.

11. A process according to claim 9, wherein the polyethylene has a melt index (MFI 190/2) of 1–8 and a density of 0.91–0.96 g/cm$^3$.

12. A process according to claim 9, wherein, for the chemical crosslinking step, dicumyl peroxide, in an amount of 0.6–1.6 parts by weight, based on 100 parts by weight of polyethylene, and 25–150 parts by weight of ethylene-propylene terpolymer are utilized.

13. A process according to claim 12, wherein the molded mixture is temperature treated (tempered) prior to crosslinking and expansion, at a temperature below the decomposition temperature of the crosslinking agent, especially at a temperature of between about 90° and 110° C. for a period of 2–90 minutes.

14. A process according to claim 12, wherein the molded mixture is temperature treated prior to crosslinking and expansion at room temperature, about 15°–20° C., for a period of at least one day.

15. A molding composition according to claim 1, wherein the polymeric components within said mixture consists of polyethylene and said terpolymer.

16. A molding composition according to claim 5, wherein the polymeric components within said mixture consists of polyethylene and said terpolymer.

17. A foam material according to claim 15, wherein the polymeric components within said mixture consists of polyethylene and said terpolymer.

18. A process according to claim 9, wherein the polymeric components within said mixture consists of polyethylene and said terpolymer.

* * * * *